United States Patent
Ishikawa et al.

(10) Patent No.: US 8,049,773 B2
(45) Date of Patent: Nov. 1, 2011

(54) STEREOSCOPIC OBSERVATION SYSTEM

(75) Inventors: Tomonori Ishikawa, Hino (JP); Kazuo Morita, Hachioji (JP); Masahiro Kudo, Hino (JP); Junichi Nozawa, Sagamihara (JP); Kazuo Banju, Hachioji (JP)

(73) Assignee: Olympus Medical Systems Corp. (JP)

( * ) Notice: Subject to any disclaimer, the term of this patent is extended or adjusted under 35 U.S.C. 154(b) by 890 days.

(21) Appl. No.: 12/055,027

(22) Filed: Mar. 25, 2008

(65) Prior Publication Data

US 2008/0239063 A1 Oct. 2, 2008

(30) Foreign Application Priority Data

Mar. 28, 2007 (JP) .................................. 2007-085762

(51) Int. Cl.
 *G02B 23/24* (2006.01)
(52) U.S. Cl. .......................................... 348/46; 359/462
(58) Field of Classification Search .................... 348/46, 348/51; 359/462, 464, 466
See application file for complete search history.

(56) References Cited

U.S. PATENT DOCUMENTS

| 5,577,991 A * | 11/1996 | Akui et al. | 600/111 |
| 6,614,595 B2 * | 9/2003 | Igarashi | 359/464 |
| 7,280,274 B2 * | 10/2007 | Hanzawa | 359/363 |
| 7,710,647 B2 * | 5/2010 | Takahashi | 359/464 |

FOREIGN PATENT DOCUMENTS

| JP | 5-341206 | 12/1993 |
| JP | 7-261094 | 10/1995 |
| JP | 8-131455 | 5/1996 |
| JP | 2004-24835 | 1/2004 |

* cited by examiner

*Primary Examiner* — Moustafa M Meky
(74) *Attorney, Agent, or Firm* — Ostrolenk Faber LLP

(57) ABSTRACT

A stereoscopic observation system includes a stereoscopic image pick up apparatus to pick up left and right images at an inward angle, a stereoscopic image display apparatus to transmit the left and right images picked up by the stereoscopic image pick up apparatus to an observer so that the images are stereoscopically observed at a convergence angle, a convergence angle change portion provided in the stereoscopic image display apparatus and to change the convergence angle, a recognition portion to recognize the stereoscopic image pick up apparatus, and a control portion to control the convergence angle change portion on the basis of the result of the recognition in the recognition portion so that the convergence angle is substantially equal to the inward angle.

3 Claims, 7 Drawing Sheets

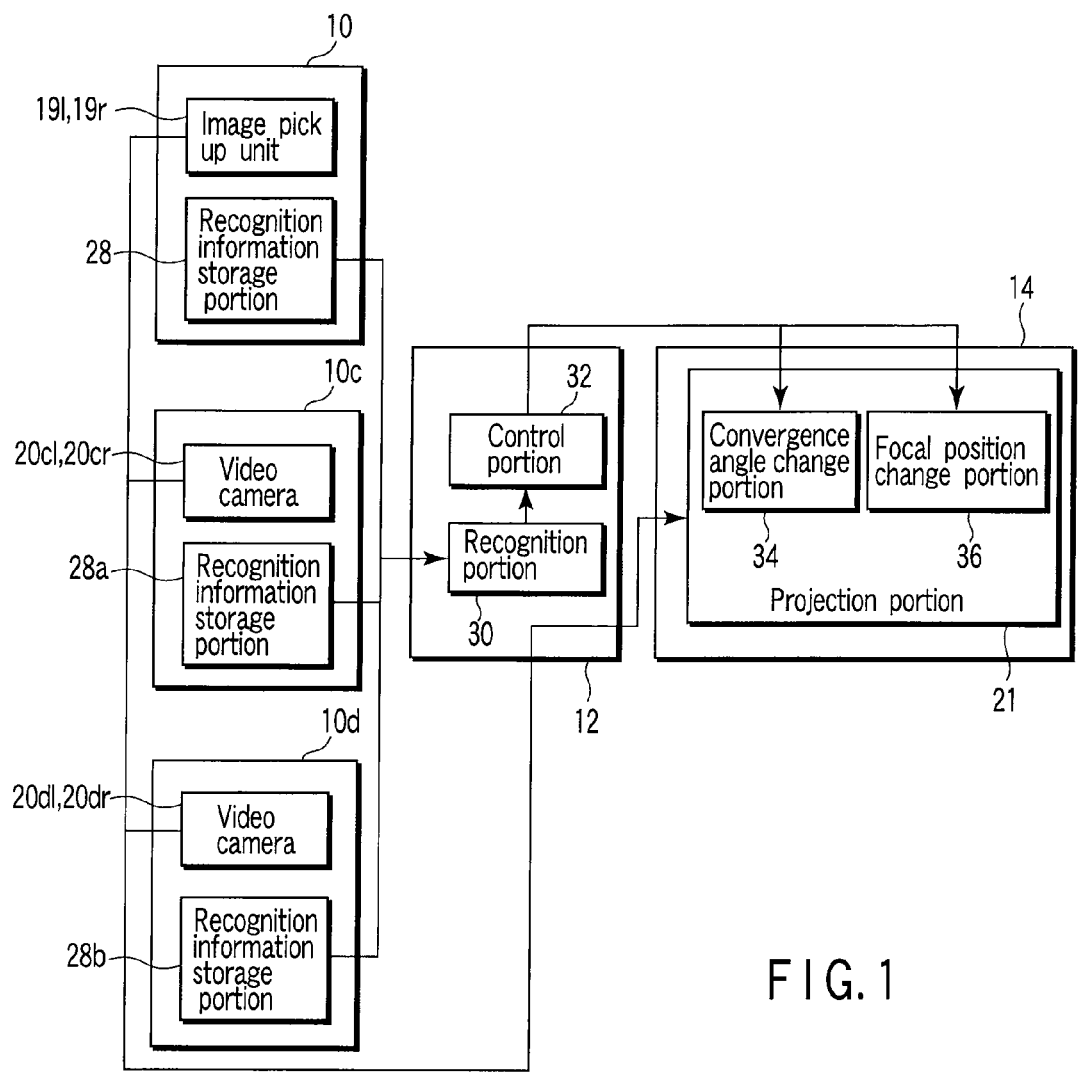
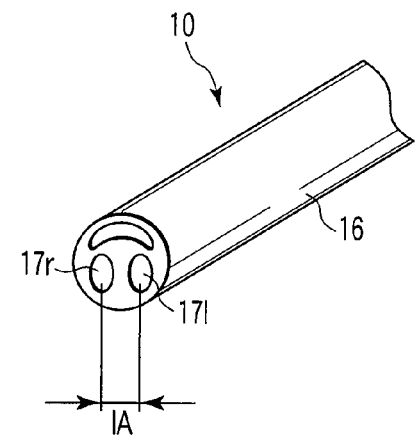
FIG. 1
FIG. 2

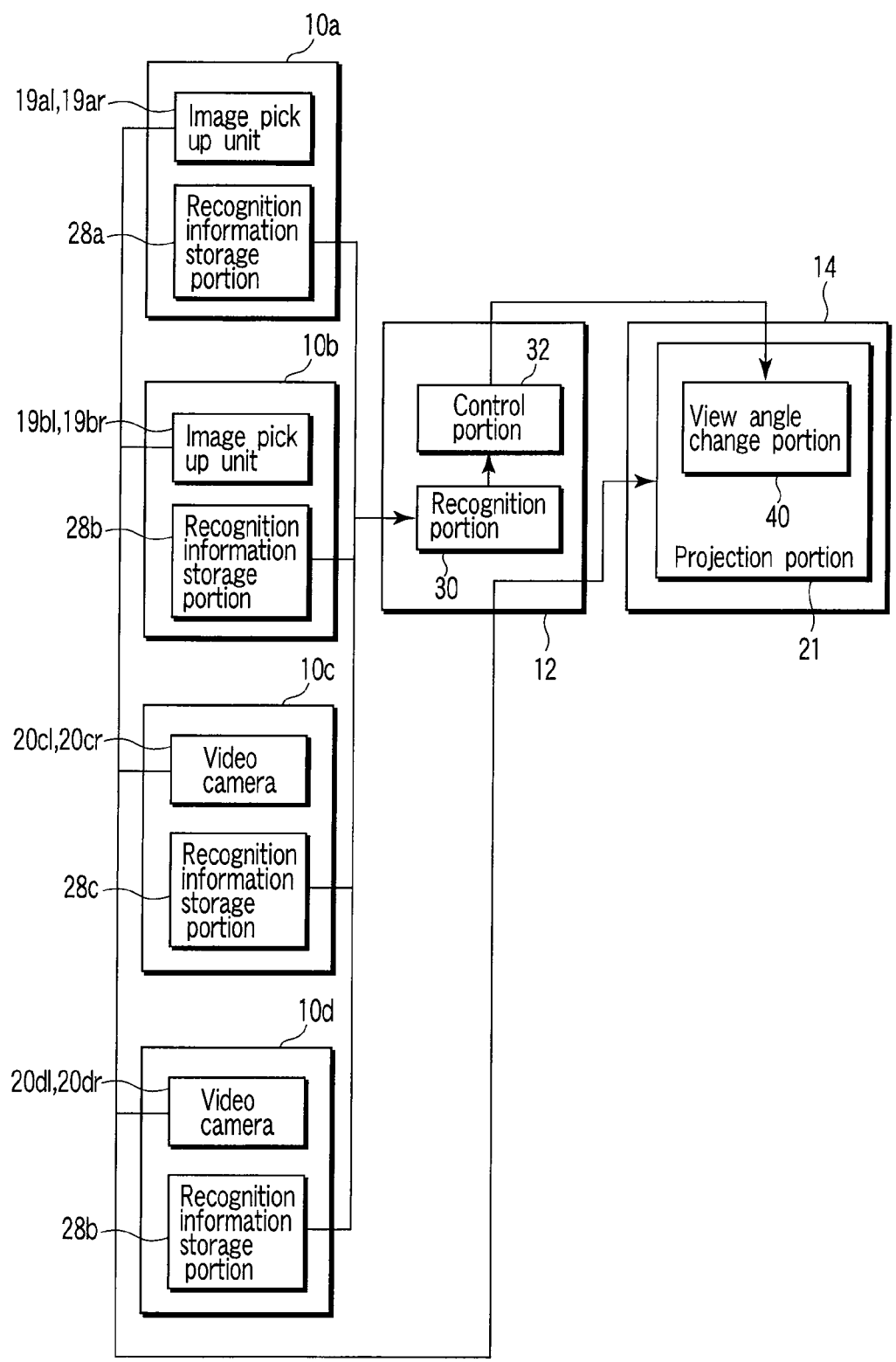
F I G. 8

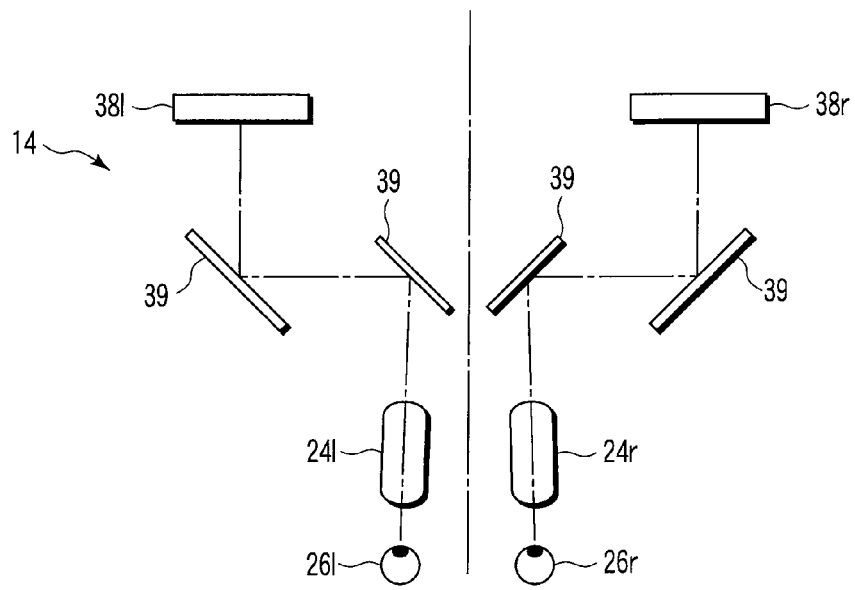
F I G. 11
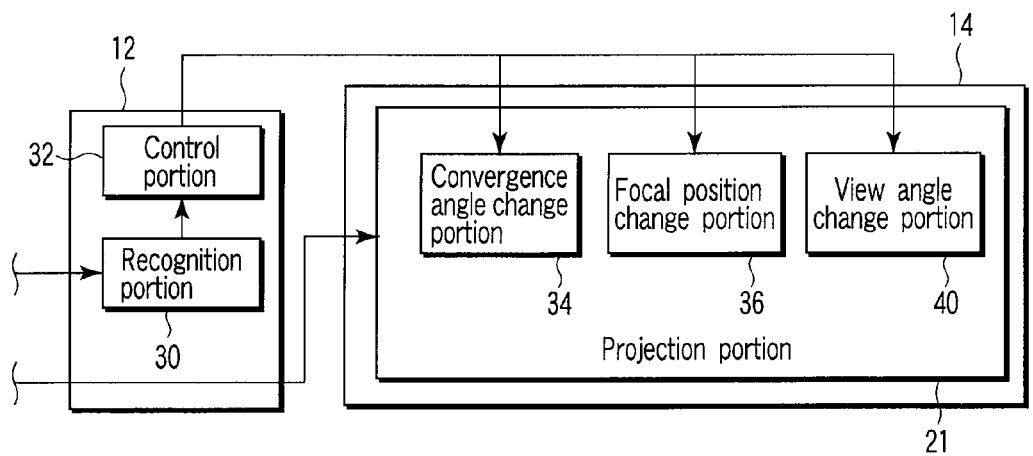
F I G. 12

STEREOSCOPIC OBSERVATION SYSTEM

CROSS-REFERENCE TO RELATED APPLICATIONS

This application is based upon and claims the benefit of priority from prior Japanese Patent Application No. 2007-085762, filed Mar. 28, 2007, the entire contents of which are incorporated herein by reference.

BACKGROUND OF THE INVENTION

1. Field of the Invention

The present invention relates to a stereoscopic observation system for carrying out a stereoscopic observation using a plurality of stereoscopic image pick up apparatuses.

2. Description of the Related Art

As described in Jpn. Pat. Appln. KOKAI Publication No. 7-261094, Jpn. Pat. Appln. KOKAI Publication No. 2004-24835 and Jpn. Pat. Appln. KOKAI Publication No. 8-131455, an operation microscope and an endoscope are used in combination with each other in surgery. Left and right observation images picked up by the operation microscope and including parallax are transmitted by a stereoscopic image display apparatus to left and right eyes of an observer respectively so that the images are stereoscopically observed. The endoscope configured to carry out the stereoscopic observation is also used, as described in Jpn. Pat. Appln. KOKAI Publication No. 5-341206.

BRIEF SUMMARY OF THE INVENTION

In an aspect of the present invention, a stereoscopic observation system includes: a stereoscopic image pick up apparatus to pick up left and right images at an inward angle; a stereoscopic image display apparatus to transmit the left and right images picked up by the stereoscopic image pick up apparatus to an observer so that the images are stereoscopically observed at a convergence angle; a convergence angle change portion provided in the stereoscopic image display apparatus and to change the convergence angle; a recognition portion to recognize the stereoscopic image pick up apparatus; and a control portion to control the convergence angle change portion on the basis of the result of the recognition in the recognition portion so that the convergence angle is substantially equal to the inward angle.

In another aspect of the present invention, a stereoscopic observation system includes: a stereoscopic image pick up apparatus to pick up left and right images at a field angle respectively; a stereoscopic image display apparatus to transmit the left and right images picked up by the stereoscopic image pick up apparatus to an observer so that the images are stereoscopically observed at a view angle respectively; a recognition portion to recognize the stereoscopic image pick up apparatus; a view angle change portion to change the view angle of the stereoscopic image pick up apparatus; and a control portion to control the view angle change portion on the basis of the result of the recognition in the recognition portion so that the view angle is substantially equal to the field angle.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a stereoscopic observation system in a first embodiment of the present invention;

FIG. 2 is a perspective view showing an endoscope of the stereoscopic observation system in the first embodiment of the present invention;

FIG. 8 is a block diagram showing a stereoscopic observation system in a second embodiment of the present invention;

FIG. 11 is a schematic diagram showing a display apparatus of the stereoscopic observation system in the second embodiment of the present invention;

FIG. 12 is a block diagram showing a stereoscopic observation system in a third embodiment of the present invention.

DETAILED DESCRIPTION OF THE INVENTION

Figure 3:
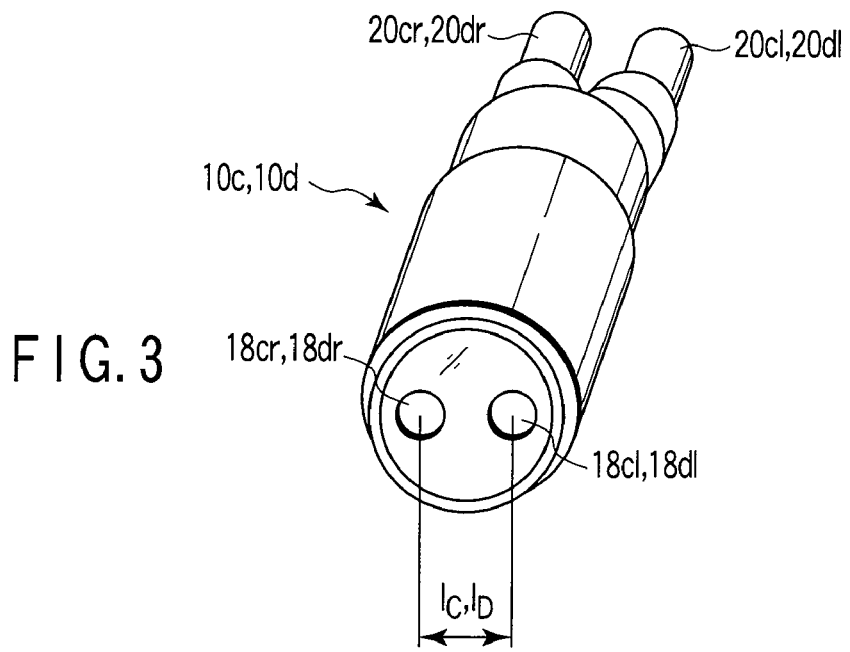
FIG. 3 is a perspective view showing a microscope of the stereoscopic observation system in the first embodiment of the present invention.
Figure 4:
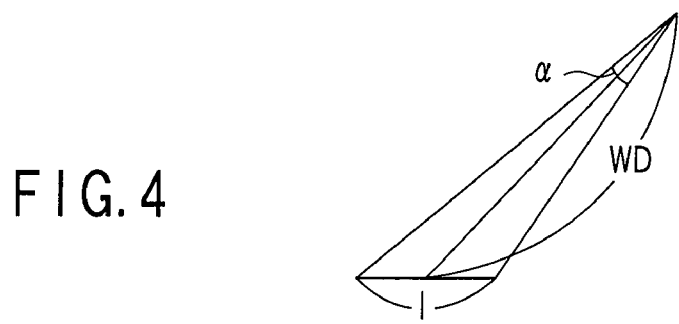
FIG. 4 is an explanatory diagram showing an inward angle in the stereoscopic observation system in the first embodiment of the present invention.

A first embodiment of the present invention will hereinafter be described with reference to FIGS. 1 to 7.

Referring to FIG. 1, a stereoscopic observation system of the present embodiment is formed of a stereoscopic observation endoscope 10 and first and second operation microscopes 10c, 10d as stereoscopic image pick up apparatuses, as well as a control apparatus 12 and a stereoscopic display apparatus 14.

Referring to FIGS. 1 to 4, in the stereoscopic observation endoscope 10, left and right observation optical systems 17l, 17r are provided at the distal end portion of an insertion portion 16 to be inserted into a body cavity. Thus, left and right endoscopic images including parallax are obtained at an inward angle $\alpha_A$ by the left and right observation optical systems 17l, 17r. Here, the inward angle $\alpha_A$ of the stereoscopic observation endoscope 10 is an angle subtended by a distance $l_A$ between the optical axes of the left and right observation optical systems 17l, 17r at a position located a working distance $WD_A$ of the stereoscopic observation endoscope 10 away. Further, the left and right endoscopic images obtained by the left and right observation optical systems 17l, 17r are picked up by left and right image pick up units 19l, 19r incorporated in the distal end portion of the insertion portion 16, respectively.

Furthermore, in the first operation microscope 10c, left and right microscopic images including parallax are obtained at an inward angle $\alpha_C$ by left and right observation optical systems 18cl, 18cr. As in the stereoscopic observation endoscope 10, the inward angle $\alpha_C$ in the first operation microscope 10c is an angle subtended by a distance $l_C$ between the optical axes of the left and right observation optical systems 18cl, 18cr at a position located a working distance $WD_C$ of the first operation microscope 10c away. Then, the left and right microscopic images obtained by the left and right observation optical systems 18cl, 18cr are picked up by left and right video cameras 20cl, 20cr, respectively. The second operation microscope 10d is similar to the first operation microscope 10c, but the inward angle $\alpha_D$ of the second operation microscope 10d is different from the inward angle $\alpha_C$ of the first operation microscope 10c.

Figure 5:
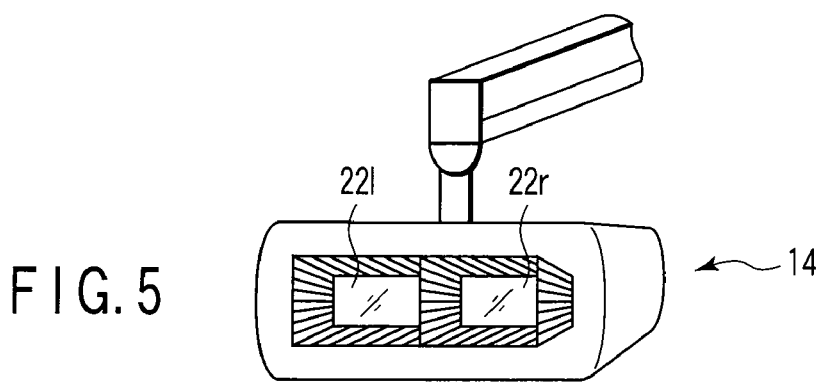
FIG. 5 is a perspective view showing a display apparatus of the stereoscopic observation system in the first embodiment of the present invention.
Figure 6:
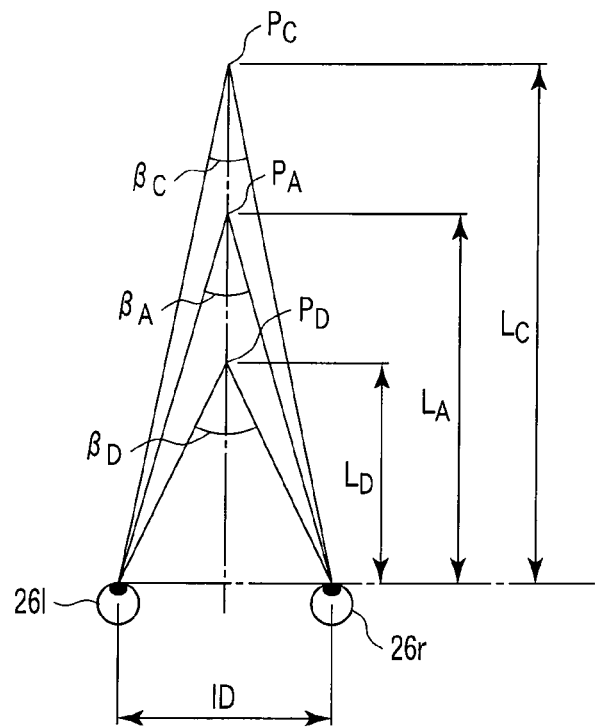
FIG. 6 is an explanatory diagram showing convergence angles in the stereoscopic observation system in the first embodiment of the present invention.

Referring to FIG. 1, FIG. 5 and FIG. 6, one stereoscopic image pick up apparatus 10, 10c, 10d of the stereoscopic observation endoscope 10 and the first and second operation microscopes 10c, 10d is selectively connected to the control apparatus 12. Then, an image pick up signal of the stereoscopic image pick up apparatus 10, 10c, 10d connected to the control apparatus 12 is output to the stereoscopic display apparatus 14 via the control apparatus 12. A projection portion 21 of this stereoscopic display apparatus 14 transmits left and right endoscopic images or microscopic images to left and right eyes 26l, 26r of an observer via left and right eyepieces 22l, 22r, respectively. Thus, a stereoscopic observation is carried out.

Here, when one stereoscopic image pick up apparatus 10, 10c, 10d of the stereoscopic observation endoscope 10 and the first and second operation microscopes 10c, 10d is connected to the control apparatus 12, a recognition signal is output from a recognition information storage portion 28, 28a, 28b of the stereoscopic image pick up apparatus to a recognition portion 30 of the control apparatus 12. Then, the recognition portion 30 recognizes which stereoscopic image pick up apparatus 10, 10c, 10d of the stereoscopic observation endoscope 10 and the first and second operation microscopes 10c, 10d is connected to the control apparatus 12. On the basis of the result of the recognition in the recognition portion 30, a control portion 32 controls a convergence angle change portion 34 and a focal position change portion 36 of the stereoscopic display apparatus 14.

Here, a convergence angle $\beta$ of the stereoscopic display apparatus 14 is an angle subtended by an interpupillary distance (regarded as constant) ID of the observer at a position located an apparent distance L of a stereoscopic observation image away. When the inward angle $\alpha$ of the stereoscopic image pick up apparatus 10, 10c, 10d is different from the convergence angle $\beta$ of the stereoscopic display apparatus 14, the stereoscopic observation image is distorted mainly in a depth direction, which hampers a proper stereoscopic observation. Thus, the control portion 32 controls the convergence angle change portion 34 to adjust the convergence angle $\beta$ so that the inward angle $\alpha$ of the stereoscopic image pick up apparatus 10, 10c, 10d connected to the control apparatus 12 and the convergence angle $\beta$ of the stereoscopic display apparatus 14 is substantially equal to each other.

Here, an apparent position P of the stereoscopic observation image changes due to the change of the convergence angle $\beta$, and when the eyes of the observer are not focused on the apparent position P, the convergence of the observer and adjustment of the eyes does not correspond to each other, which hampers a proper stereoscopic observation. Thus, the control portion 32 controls the focal position change portion 36 to adjust the focus so that the eyes of the observer is focused on the apparent position P.

A specific configuration of the stereoscopic display apparatus 14 of the present embodiment is described with reference to FIG. 7.

In this stereoscopic display apparatus 14, left and right images are transmitted from left and right monitors 38l, 38r to display the left and right images to the left and right eyes 26l, 26r of the observer via mirrors 39, respectively. Then, each of the whole left and right monitors 38l, 38r is mechanically moved in a left and right direction (see arrows El, Er in FIG. 7), such that the convergence angle $\beta$ is adjusted. Further, the eyepieces 22l, 22r are interposed on optical paths wherein the left and right images are transmitted, and the eyepieces 22l, 22r are mechanically moved along the optical paths (see arrows Fl, Fr in FIG. 7), such that the focus is adjusted.

Therefore, the stereoscopic observation system of the present embodiment includes the following advantages:

In the stereoscopic observation system of the present embodiment, the stereoscopic observation endoscope 10 and the first and second operation microscopes 10c, 10d including different inward angles $\alpha$ are used, but the convergence angle $\beta$ of the stereoscopic display apparatus 14 is changed so that it equal to the inward angle of the stereoscopic image pick up apparatus 10, 10c, 10d connected to the control apparatus 12, which makes it possible to obtain a proper stereoscopic observation image.

Furthermore, the stereoscopic display apparatus 14 carries out the focus adjustment to focus on the apparent position P of the stereoscopic observation image when the apparent position P is moved due to the change of the convergence angle $\beta$. This makes it possible to obtain an optimum stereoscopic observation image.

While the whole left and right monitors 38l, 38r are mechanically moved to adjust the convergence angle $\beta$ in the present embodiment, the left and right images may be electrically moved within screens of the left and right monitors 38l, 38r to adjust the convergence angle $\beta$.

Furthermore, while the eyepieces 22l, 22r are moved along the optical paths to adjust the focus in the present embodiment, the eyepieces 22l, 22r may be inserted into or removed from the optical paths to change the focal position to adjust the focus when two stereoscopic image pick up apparatuses including different inward angles $\alpha$ are used.

Moreover, while the recognition is achieved by outputting the recognition signal from the recognition information storage portion 28, 28a, 28b of the stereoscopic image pick up apparatus 10, 10c, 10d to the recognition portion 30 of the control apparatus 12 in the present embodiment, the recognition may be achieved by other electric and mechanical methods.

FIGS. 8 to 11 show a second embodiment of the present invention. The same reference numbers are assigned to components including functions similar to those in the first embodiment, and these components are not described.

Figure 9:
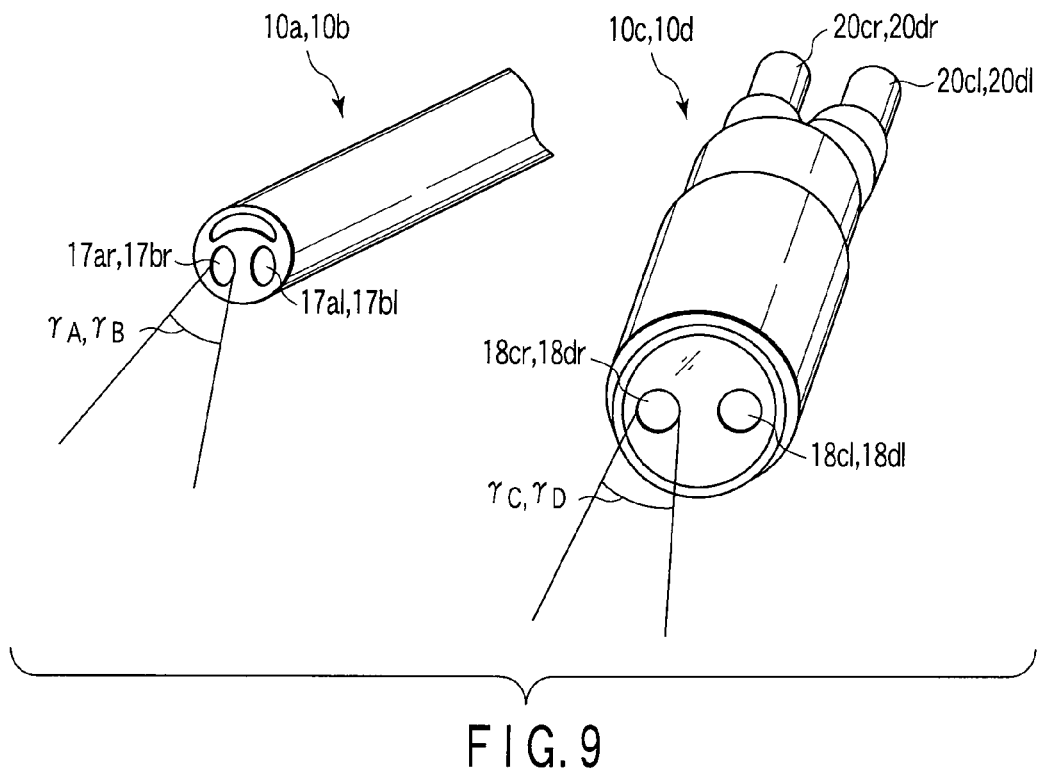
FIG. 9 is an explanatory diagram showing field angles in the stereoscopic observation system in the second embodiment of the present invention.
Figure 10:
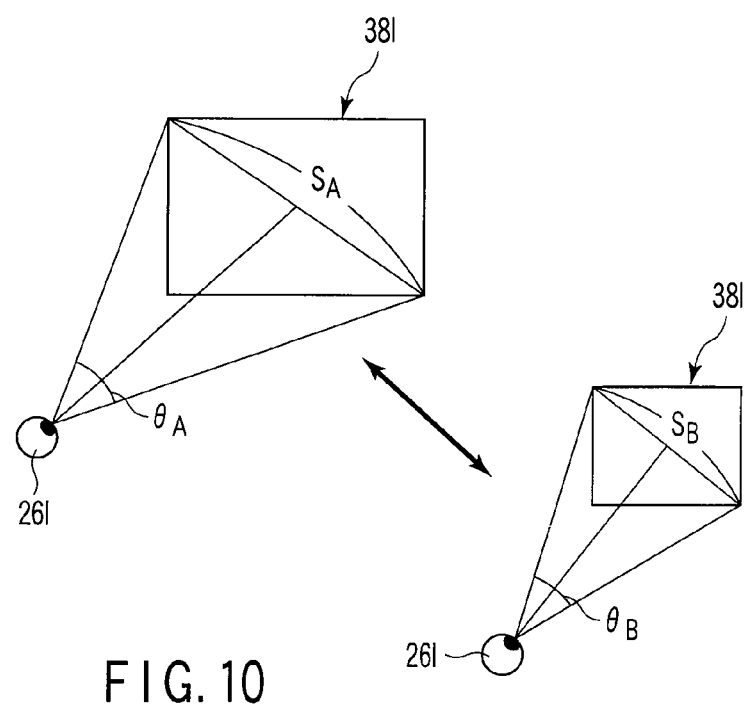
FIG. 10 is an explanatory diagram showing view angles in the stereoscopic observation system in the second embodiment of the present invention.

Referring to FIGS. 8 and 9, the stereoscopic observation system of the present embodiment includes first and second stereoscopic observation endoscopes 10a, 10b and the first and second operation microscopes 10c, 10d, as stereoscopic image pick up apparatuses. The observation optical systems 17al, 17ar; 17bl, 17br; 18cl, 18cr; 18dl, 18dr of the first and second stereoscopic observation endoscopes 10a, 10b and the first and second operation microscopes 10c, 10d includes different field angles $\gamma_A, \gamma_B, \gamma_C, \gamma_D$.

As in the first embodiment, the left and right images are picked up by the left and right image pick up units 19al, 19ar; 19bl, 19br of the first and second stereoscopic observation endoscopes 10a, 10b and by the left and right video cameras 20cl, 20cr; 20dl, 20dr of the first and second operation microscopes 10c, 10d. Then, the image pick up signal of the stereoscopic image pick up apparatus 10a, 10b, 10c, 10d connected to the control apparatus 12 is output to the stereoscopic display apparatus 14 via the control apparatus 12, and the left and right images are transmitted from the projection portion 21 of the stereoscopic display apparatus 14 to left and right eyes 26l, 26r of an observer, such that the stereoscopic observation is carried out.

Furthermore, as in the first embodiment, the recognition portion 30 recognizes which stereoscopic image pick up apparatus 10a, 10b, 10c, 10d of the first and second stereoscopic observation endoscopes 10a, 10b and the first and second operation microscopes 10c, 10d is connected to the control apparatus 12, on the basis of the recognition signal from the recognition information storage portion 28a, 28a, 28c, 28d. On the basis of the result of the recognition in the recognition portion 30, the control portion 32 then controls a view angle change portion 40 of the stereoscopic display apparatus 14. Here, a view angle θ in the stereoscopic display apparatus 14 is an angle subtended by an apparent size (apparent diagonal length S) of an image in a screen of the left or right monitor 38l, 38r at the left or right eye of the observer. When the field angle γ of the stereoscopic image pick up apparatus 10a, 10b, 10c, 10d is different from the view angle θ in the stereoscopic display apparatus 14, the stereoscopic observation image is distorted mainly in a transverse direction, which hampers a proper stereoscopic observation. Thus, the control portion 32 controls the view angle change portion 40 to adjust the view angle θ so that the field angle γ of the observation optical system 17al, 17ar; 17bl, 17br; 18cl, 18cr; 18dl, 18dr of the stereoscopic image pick up apparatus 10a, 10b, 10c, 10d connected to the control apparatus 12 and the view angle θ in the stereoscopic display apparatus 14 is substantially equal to each other.

A specific configuration of the stereoscopic display apparatus 14 of the present embodiment is described with reference to FIG. 11.

In this stereoscopic display apparatus 14, left and right variable power eyepieces 24l, 24r capable of power adjustment are interposed on the optical paths wherein the left and right images are transmitted. The apparent sizes (apparent diagonal lengths S) of the images displayed on the left and right monitors 38l, 38r are increased or decreased by the left and right variable power eyepieces 24l, 24r, such that the view angle θ is adjusted.

Therefore, the stereoscopic observation system of the present embodiment includes the following advantages:

In the stereoscopic observation system of the present embodiment, the first and second stereoscopic observation endoscopes 10a, 10b and the first and second operation microscopes 10c, 10d including different field angles γ are used, but the view angle θ in the stereoscopic display apparatus 14 is changed so that it is substantially equal to the field angle γ of the stereoscopic image pick up apparatus 10a, 10b, 10c, 10d connected to the control apparatus 12, which makes it possible to obtain a proper stereoscopic observation image.

While the apparent sizes of the images displayed on the left and right monitors 38l, 38r are increased or decreased by the left and right variable power eyepieces 24l, 24r to adjust the view angle θ in the present embodiment, the sizes of the left and right images may be electrically increased or decreased in the screens of the left and right monitors 38l, 38r to adjust the view angle θ.

FIG. 12 shows a third embodiment of the present invention. The same reference numbers are assigned to components including functions similar to those in the first and second embodiments, and these components are not described.

The stereoscopic observation system of the present embodiment includes the first and second stereoscopic observation endoscopes and the first and second operation microscopes including the different view angles θ and field angles γ. Then, as in the first and second embodiments, the convergence angle change portion 34, the focal position change portion 36 and the view angle change portion 40 in the stereoscopic display apparatus 14 are controlled by the control portion 32 of the control apparatus 12 on the basis of the result of the recognition in the recognition portion 30, such that the convergence angle β, the focus and the view angle θ substantially correspond to the inward angle α, the apparent position P and the field angle γ.

Figure 13:
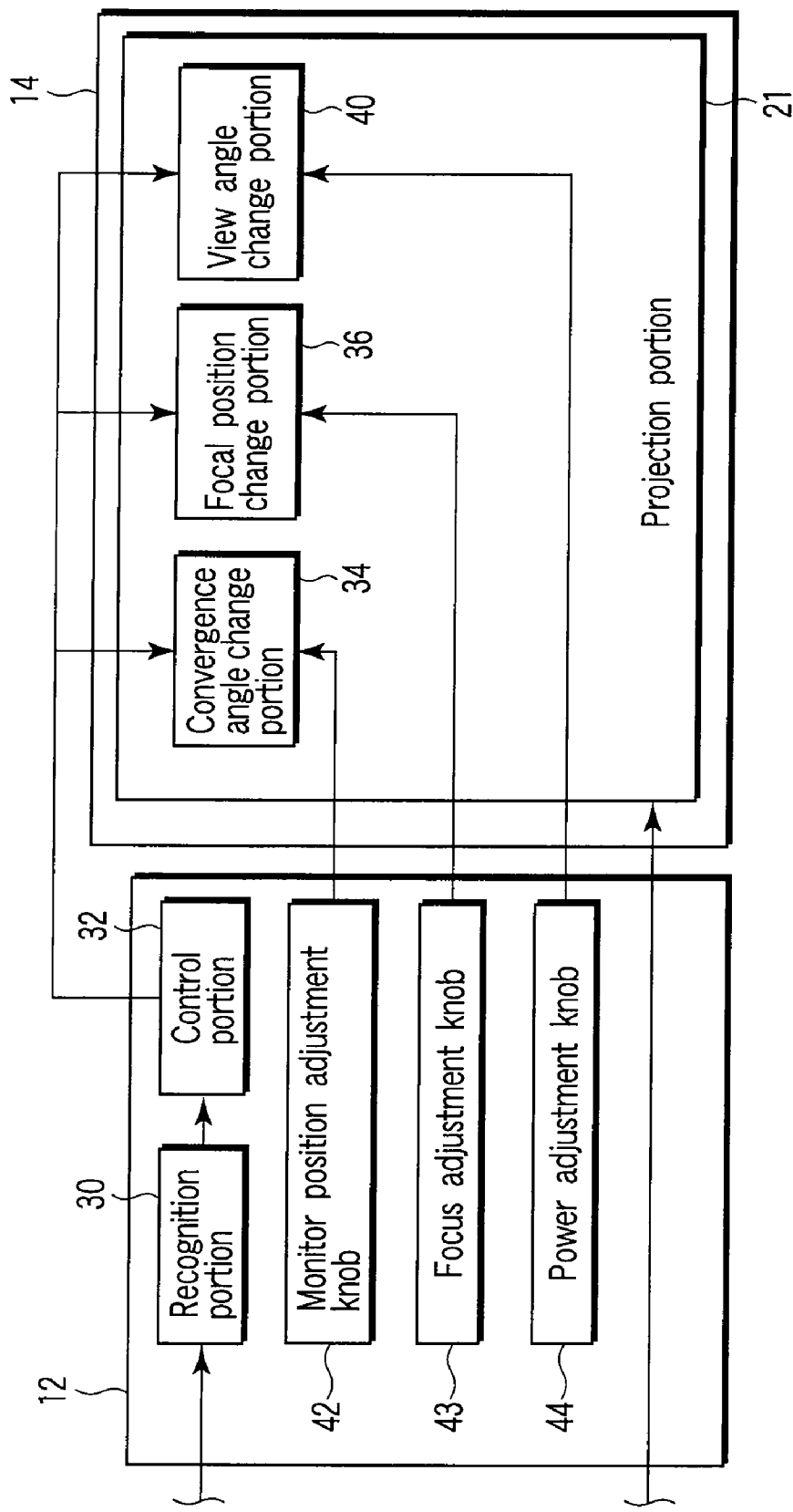
FIG. 13 is a block diagram showing a control apparatus in a stereoscopic observation system in a fourth embodiment of the present invention.

FIG. 13 shows a fourth embodiment of the present invention. The same reference numbers are assigned to components including functions similar to those in the third embodiment, and these components are not described.

Figure 7:
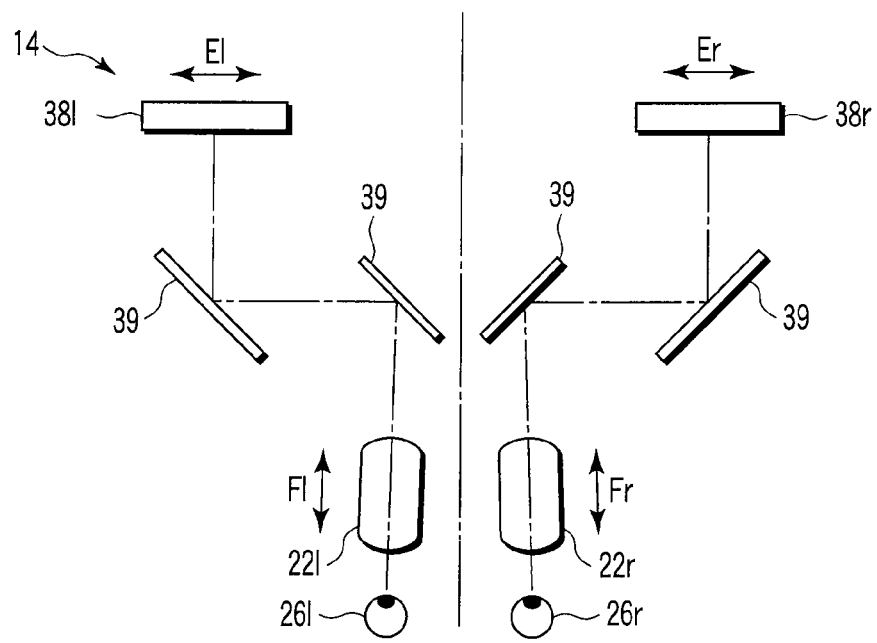
FIG. 7 is a schematic diagram showing the display apparatus of the stereoscopic observation system in the first embodiment of the present invention.

Referring to FIGS. 7 and 11 as well, the control apparatus 12 of the stereoscopic observation system of the present embodiment is provided with a monitor position adjustment knob 42, a focus adjustment knob 43 and a power adjustment knob 44 for manual fine-adjustment to the positions of left and right monitors 38l, 38r, the focuses of variable power eyepieces 24l, 24r, and the powers of the variable power eyepieces 24l, 24r, respectively.

A complete stereoscopic image may not be obtained by automatic adjustment due to individual difference between observers and so on, but a complete stereoscopic image can be obtained by the adjustment with the adjustment knobs 42, 43, 44 in the present embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereoscopic observation system comprising:
   a stereoscopic image pick up apparatus to pick up left and right images at an inward angle;
   a stereoscopic image display apparatus to transmit the left and right images picked up by the stereoscopic image pick up apparatus to an observer so that the images are stereoscopically observed at a convergence angle;
   a convergence angle change portion provided in the stereoscopic image display apparatus and to change the convergence angle;
   a recognition portion to recognize the stereoscopic image pick up apparatus; and
   a control portion to control the convergence angle change portion on the basis of the result of the recognition in the recognition portion so that the convergence angle is substantially equal to the inward angle.

2. The stereoscopic observation system according to claim 1, wherein
   the stereoscopic image display apparatus includes a focal position change portion to change a focal position, and
   the control portion controls the focal position change portion to focus on an apparent position when the apparent position is moved due to a change in the convergence angle.

3. A stereoscopic observation system comprising:
   a stereoscopic image pick up apparatus to pick up left and right images at a field angle respectively;
   a stereoscopic image display apparatus to transmit the left and right images picked up by the stereoscopic image pick up apparatus to an observer so that the images are stereoscopically observed at a view angle respectively;
   a recognition portion to recognize the stereoscopic image pick up apparatus;
   a view angle change portion to change the view angle of the stereoscopic image pick up apparatus; and
   a control portion to control the view angle change portion on the basis of the result of the recognition in the recognition portion so that the view angle is substantially equal to the field angle.

* * * * *